United States Patent
Wu et al.

(10) Patent No.: US 11,783,860 B2
(45) Date of Patent: Oct. 10, 2023

(54) PRE-PRODUCTION SYSTEMS FOR MAKING MOVIES, TV SHOWS AND MULTIMEDIA CONTENTS

(71) Applicant: WeMovie Technologies, San Ramon, CA (US)

(72) Inventors: Xidong Wu, San Ramon, CA (US); Xiubo Wu, Beijing (CN)

(73) Assignee: WeMovie Technologies, San Ramon, CA (US)

( * ) Notice: Subject to any disclaimer, the term of this patent is extended or adjusted under 35 U.S.C. 154(b) by 0 days.

(21) Appl. No.: 17/461,966

(22) Filed: Aug. 30, 2021

(65) Prior Publication Data

US 2021/0398565 A1    Dec. 23, 2021

Related U.S. Application Data (63) Continuation of application No. 16/926,295, filed on Jul. 10, 2020, now Pat. No. 11,107,503, which is a
(Continued)

(51) Int. Cl.
  *G11B 27/031*    (2006.01)
  *G06F 3/0484*    (2022.01)

(52) U.S. Cl.
  CPC .......... *G11B 27/031* (2013.01); *G06F 3/0484* (2013.01)

(58) Field of Classification Search
  CPC .................................................. G11B 27/031
  See application file for complete search history.

(56) References Cited

U.S. PATENT DOCUMENTS 6,466,655 B1   10/2002   Clark
8,244,104 B2   8/2012   Kashiwa
(Continued)

FOREIGN PATENT DOCUMENTS

CA   3038767        10/2019
CN   101316362 A    12/2008
(Continued)

OTHER PUBLICATIONS

International Search Report and Written Opinion dated Mar. 10, 2020 in International Application No. PCT/CN2019/090722, 10 pages.
(Continued)

*Primary Examiner* — James J Debrow
(74) *Attorney, Agent, or Firm* — Perkins Coie LLP (57) ABSTRACT

Methods, apparatus and systems related to pre-production stage of a movie, a TV show or a multimedia content are described. In one example aspect, a pre-production system for producing a multimedia digital content including a movie includes a user interface operable to receive information about a storyline, cameras, cast, and other assets for the movie from a user, a processor, and a memory including processor executable code. The processor executable code upon execution by the processor configures the processor to determine one or more scenes based on the storyline, generate one or more machine-readable scripts corresponding to the one or more scenes, and automatically update the one or more machine-readable scripts to satisfy one or more constraints for producing the multimedia digital content.

20 Claims, 8 Drawing Sheets

Related U.S. Application Data continuation of application No. PCT/CN2019/109919, filed on Oct. 8, 2019.

(56) References Cited

U.S. PATENT DOCUMENTS

| | | | |
|---|---|---|---|
| 8,560,951 B1 | 10/2013 | Snyder | |
| 8,910,201 B1 | 12/2014 | Zamiska et al. | |
| 9,106,812 B1 | 8/2015 | Price et al. | |
| 9,998,722 B2 | 6/2018 | Swearingen et al. | |
| 10,057,537 B1 | 8/2018 | MacDonald-King et al. | |
| 10,721,377 B1 * | 7/2020 | Wu et al. | H04N 5/2228 |
| 11,070,888 B1 | 7/2021 | Wu et al. | |
| 11,107,503 B2 | 8/2021 | Wu et al. | |
| 11,166,086 B1 | 11/2021 | Wu et al. | |
| 11,315,602 B2 | 4/2022 | Wu et al. | |
| 11,321,639 B1 | 5/2022 | Wu et al. | |
| 11,330,154 B1 | 5/2022 | Wu et al. | |
| 2002/0099577 A1 | 7/2002 | Black | |
| 2003/0061610 A1 | 3/2003 | Errico | |
| 2006/0053041 A1 * | 3/2006 | Sakai | G05B 19/418 |
| 2006/0251382 A1 | 11/2006 | Vronay et al. | |
| 2006/0282783 A1 | 12/2006 | Covell et al. | |
| 2006/0282785 A1 | 12/2006 | McCarthy et al. | |
| 2007/0099684 A1 | 5/2007 | Butterworth | |
| 2008/0010601 A1 | 1/2008 | Dachs | |
| 2008/0028318 A1 | 1/2008 | Shikuma | |
| 2008/0033801 A1 | 2/2008 | McKenna et al. | |
| 2008/0036917 A1 | 2/2008 | Pascarella et al. | |
| 2008/0101476 A1 | 5/2008 | Tian et al. | |
| 2009/0063659 A1 | 3/2009 | Kazerouni et al. | |
| 2009/0279840 A1 | 11/2009 | Kudo et al. | |
| 2011/0085025 A1 | 4/2011 | Pace et al. | |
| 2011/0162002 A1 | 6/2011 | Jones et al. | |
| 2011/0206351 A1 | 8/2011 | Givoly | |
| 2011/0249953 A1 | 10/2011 | Suri et al. | |
| 2012/0294589 A1 | 11/2012 | Samra et al. | |
| 2013/0067333 A1 | 3/2013 | Brenneman | |
| 2013/0124984 A1 | 5/2013 | Kuspa | |
| 2013/0151970 A1 | 6/2013 | Achour | |
| 2013/0166625 A1 | 6/2013 | Swaminathan et al. | |
| 2013/0167168 A1 * | 6/2013 | Ellis et al. | H04N 21/44218 |
| 2013/0204664 A1 * | 8/2013 | Romagnolo et al. | G06Q 30/0203 |
| 2013/0232178 A1 | 9/2013 | Katsambas | |
| 2013/0290557 A1 | 10/2013 | Baratz | |
| 2014/0082079 A1 | 3/2014 | Dunsmuir | |
| 2014/0119428 A1 | 5/2014 | Catchpole et al. | |
| 2014/0132841 A1 | 5/2014 | Beaulieu-Jones et al. | |
| 2014/0133834 A1 | 5/2014 | Shannon | |
| 2014/0328570 A1 | 11/2014 | Cheng et al. | |
| 2015/0012325 A1 | 1/2015 | Maher | |
| 2015/0043892 A1 | 2/2015 | Groman | |
| 2015/0082349 A1 | 3/2015 | Ishtiaq et al. | |
| 2015/0256858 A1 | 9/2015 | Xue | |
| 2015/0261403 A1 | 9/2015 | Greenberg et al. | |
| 2015/0281710 A1 | 10/2015 | Sievert et al. | |
| 2015/0302893 A1 | 10/2015 | Shannon | |
| 2015/0363718 A1 | 12/2015 | Boss et al. | |
| 2015/0379358 A1 | 12/2015 | Renkis | |
| 2016/0027198 A1 | 1/2016 | Terry et al. | |
| 2016/0050465 A1 | 2/2016 | Zaheer et al. | |
| 2016/0071544 A1 | 3/2016 | Waterston et al. | |
| 2016/0132546 A1 | 5/2016 | Keating | |
| 2016/0292509 A1 | 10/2016 | Kaps et al. | |
| 2016/0323483 A1 | 11/2016 | Brown | |
| 2016/0360298 A1 | 12/2016 | Chalmers et al. | |
| 2017/0017644 A1 | 1/2017 | Accardo et al. | |
| 2017/0048492 A1 | 2/2017 | Buford et al. | |
| 2017/0169853 A1 | 6/2017 | Hu et al. | |
| 2017/0178346 A1 | 6/2017 | Ferro et al. | |
| 2017/0337912 A1 * | 11/2017 | Caligor et al. | G10H 1/0058 |
| 2017/0358023 A1 | 12/2017 | Peterson | |
| 2018/0005037 A1 | 1/2018 | Smith et al. | |
| 2018/0213289 A1 | 7/2018 | Lee et al. | |
| 2019/0045194 A1 | 2/2019 | Zavesky et al. | |
| 2019/0058845 A1 | 2/2019 | MacDonald-King et al. | |
| 2019/0107927 A1 | 4/2019 | Schriber et al. | |
| 2019/0155829 A1 | 5/2019 | Schriber et al. | |
| 2019/0215421 A1 | 7/2019 | Parthasarathi et al. | |
| 2019/0215540 A1 | 7/2019 | Nicol et al. | |
| 2019/0230387 A1 | 7/2019 | Gersten | |
| 2019/0356948 A1 | 11/2019 | Stojancic et al. | |
| 2020/0081596 A1 | 3/2020 | Greenberg et al. | |
| 2020/0168186 A1 | 5/2020 | Yamamoto | |
| 2020/0213644 A1 | 7/2020 | Gupta et al. | |
| 2020/0312368 A1 | 10/2020 | Waterman | |
| 2020/0327190 A1 * | 10/2020 | Agrawai et al. | G06F 17/276 |
| 2020/0364668 A1 | 11/2020 | Altunkaynak | |
| 2020/0396357 A1 | 12/2020 | Wu et al. | |
| 2021/0011960 A1 | 1/2021 | Chambon-Cartier | |
| 2021/0084085 A1 | 3/2021 | Jones et al. | |
| 2021/0104260 A1 | 4/2021 | Wu et al. | |
| 2021/0185222 A1 | 6/2021 | Zavesky et al. | |
| 2021/0211779 A1 | 7/2021 | Wu et al. | |
| 2021/0350829 A1 | 11/2021 | Wu et al. | |
| 2022/0070540 A1 | 3/2022 | Wu et al. | |
| 2022/0254378 A1 | 8/2022 | Wu et al. | |

FOREIGN PATENT DOCUMENTS

| | | | |
|---|---|---|---|
| CN | 101365094 | 2/2009 | |
| CN | 101960440 | 1/2011 | |
| CN | 104581222 | 4/2015 | |
| CN | 108447129 A | 8/2018 | |
| CN | 109196371 | 1/2019 | |
| CN | 109783659 A | 5/2019 | |
| CN | 109905732 | 6/2019 | |
| FR | WO 2014/090730 A1 * | 6/2017 | G06Q 30/02 |
| JP | 2000101647 A | 4/2000 | |
| WO | 2004105035 A1 | 12/2004 | |
| WO | 2008156558 A1 | 12/2008 | |
| WO | 2010068175 A2 | 6/2010 | |
| WO | 2011004381 A1 | 1/2011 | |

OTHER PUBLICATIONS

Davenport, Glorianna, et al., "Cinematic primitives for multimedia", MIT Media Laboratory, IEEE Computer graphics and Applications, pp. 67-74, Jul. 1991.

International Search Report and Written Opinion dated May 7, 2020 for International Application No. PCT/CN2019/099534, filed on Aug. 7, 2019 (9 pages).

International Search Report and Written Opinion dated May 27, 2020 for International Application No. PCT/CN2019/109919, filed on Oct. 8, 2019 (11 pages).

International Search Report and Written Opinion dated Aug. 7, 2020 for International Application No. PCT/US2020/032217, filed on May 8, 2020 (10 pages).

International Search Report and Written Opinion dated Jan. 3, 2022 for International Application No. PCT/US2021/047407, filed on Aug. 24, 2021 (20 pages).

P. Minardi and B. Alonso, "How Automation Can Help Broadcasters and Production Companies Reach Video Production Nirvana," SMPTE17: Embracing Connective Media, 2015, pp. 1-12, doi: 10.5594/M001738. (Year: 2015).

International Search Report and Written Opinion dated Feb. 28, 2022 for International Application No. PCT/US2021/056839, filed on Oct. 27, 2021 (16 pages).

Hua et al., "AVE—Automated Home Video Editing," Proceedings of the 11th ACM International Conference on Multimedia, MM '03, Berkeley, CA, Nov. 2-8, 2003.

Tunikova, Oksana, "Product Placement—A Good Advertising Adaptation?," Business 2 Community, available at https://www.business2community.com/marketing/product-placement-good-advertising-adaptation-02026643.

Extended European Search Report for European Patent Application No. 19932602.6, dated Nov. 25, 2022 (8 pages).

(56) References Cited

OTHER PUBLICATIONS

Office Action for Chinese Patent Application No. 201980098650.5, dated Nov. 10, 2022 (15 pages).

\* cited by examiner

PRE-PRODUCTION SYSTEMS FOR MAKING MOVIES, TV SHOWS AND MULTIMEDIA CONTENTS

PRIORITY CLAIM AND RELATED APPLICATION

This patent document is a continuation of U.S. patent application Ser. No. 16/926,295, filed on Jul. 10, 2020, which is a continuation of and claims priority to and benefits of International Patent Application No. PCT/CN19/109919 of the same title and the same content, filed on Oct. 8, 2019. The entire contents of the before-mentioned patent applications are incorporated by reference as part of the disclosure of this application.

TECHNICAL FIELD

This patent document relates to production of motion pictures, videos, movies or multimedia products including moving images and associated online distribution or streaming services.

BACKGROUND

Making a movie, a TV show or multimedia contents is a labor-intensive and financially costly process. For example, the entire production process of a movie may take more than a year and requires collaboration from a large and diverse crew. The complex and prolonged movie production process drives up the production cost. The labor-intensive nature and the high costs of movie and TV program production are barriers to many contents to be offered to consumers and have continued to exist in the era of the increasingly digitization of various processes and progresses in cloud technologies in the movie and TV production and distribution.

With the advancements in network communication and digital editing, content publishing becomes increasingly popular. Nowadays, making and sharing a video clip can be done at a relatively low cost and with ease via computer and communications networks. Movie and TV productions, however, remain a complicated and costly undertaking for a range of movie and video production projects including some low-budget movie and video projects.

SUMMARY

Described herein are techniques, subsystems and systems for providing cloud-based pre-production services for making movies and videos, particularly for the pre-production stage. The disclosed techniques and systems can be used in various embodiments to reduce the complexity, time, and cost in pre-production planning.

In one example aspect, a pre-production system for producing a multimedia digital content including a movie or a TV show comprises a user interface operable to receive information about a storyline, cameras, cast, and other assets for the multimedia digital content, a processor that processes the received information from the user interface to perform operations based on the received information, and a memory including processor executable code. The processor executable code upon execution by the processor configures the processor to determine one or more scenes based on the storyline, generate one or more machine-readable scripts corresponding to the one or more scenes, and automatically update the one or more machine-readable scripts to satisfy one or more constraints for producing the multimedia digital content. The one or more machine-readable scripts include scheduling information, personnel information, or budget information for the multimedia digital content.

In another example aspect, a method for producing a multimedia digital content including a movie or a TV show comprises receiving, via a user interface, information about a storyline, cameras, cast, and other assets for the multimedia digital content, determining one or more scenes based on the storyline, generating one or more machine-readable scripts corresponding to the one or more scenes, and automatically updating the one or more machine-readable scripts to satisfy one or more constraints for producing the multimedia digital content. The one or more machine-readable scripts include scheduling information, personnel information, or budget information for the multimedia digital content.

The disclosed techniques can further facilitate production and post-production editing via digital analytics and digital intelligence, thereby allowing highly efficient production or creation of content. Users do not need to master sophisticated computing hardware or software knowledge. Non-professionals are thus able to produce movies without being deeply involved in the technical aspects of movie productions.

The above and other aspects, features and implementations are described in greater detail in the drawings, the description and the claims.

DETAILED DESCRIPTION

The production of movies, TV programs or multimedia contents is a complex process involving many components and operations and tends to be labor intensive and costly. The examples of various production techniques and systems disclosed in this patent document can be used to leverage computing technologies via computer processors, computer servers and computer storages that are networked in one or more communication networks or systems to provide cloud-based movie production services to users or entities in a distributed manner. In some aspects, implementations of disclosed production techniques and systems may provide cloud-based service features that allow fully automated pre-production process of multimedia contents. The following sections use the movie production as an example and many disclosed features are applicable to TV program production and production of other multimedia with digital moving images.

Figure 1:
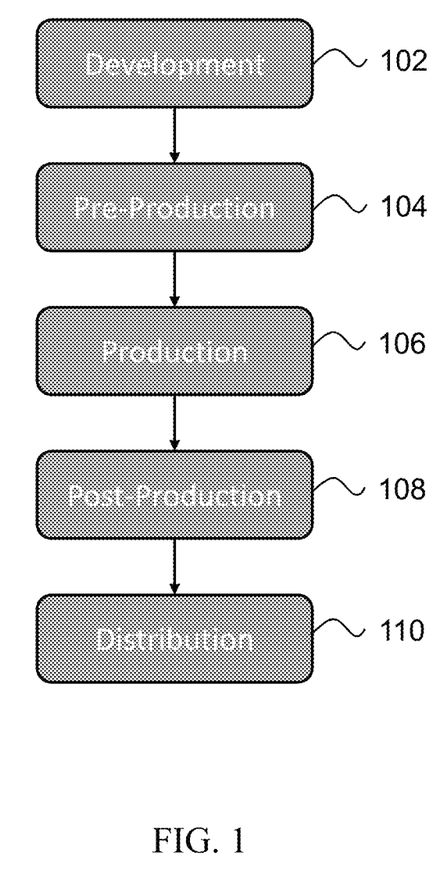
FIG. 1 illustrates various stages in a movie production process.

FIG. 1 illustrates various stages in a movie production process. A movie production project starts with the development stage 102, in which a script is developed based on an idea, a story, a book, or an existing script. The pre-production stage 104 focuses heavily on planning. This is the stage in which the budget is determined, the preliminary production schedule is set, and the cast is selected. At the end of pre-production stage, a detailed movie script is produced and can be relied upon by all later stages in the production process. The production stage 106 starts after the cast is hired and all the assets (equipment, materials, etc.) are secured. The post-production stage 108 typically starts after the production stage 106 finishes, but these two stages may overlap. Typical post-production tasks include editing, digitizing the footage, compression, and/or color correction. In various movie productions today, digital video cameras and digital sound recording devices are used to capture all the images and sound in digital form for post-production editing. The completed film is digital (including one or more digital files) and is distributed in the distribution stage 110 to the audience.

Figure 2:
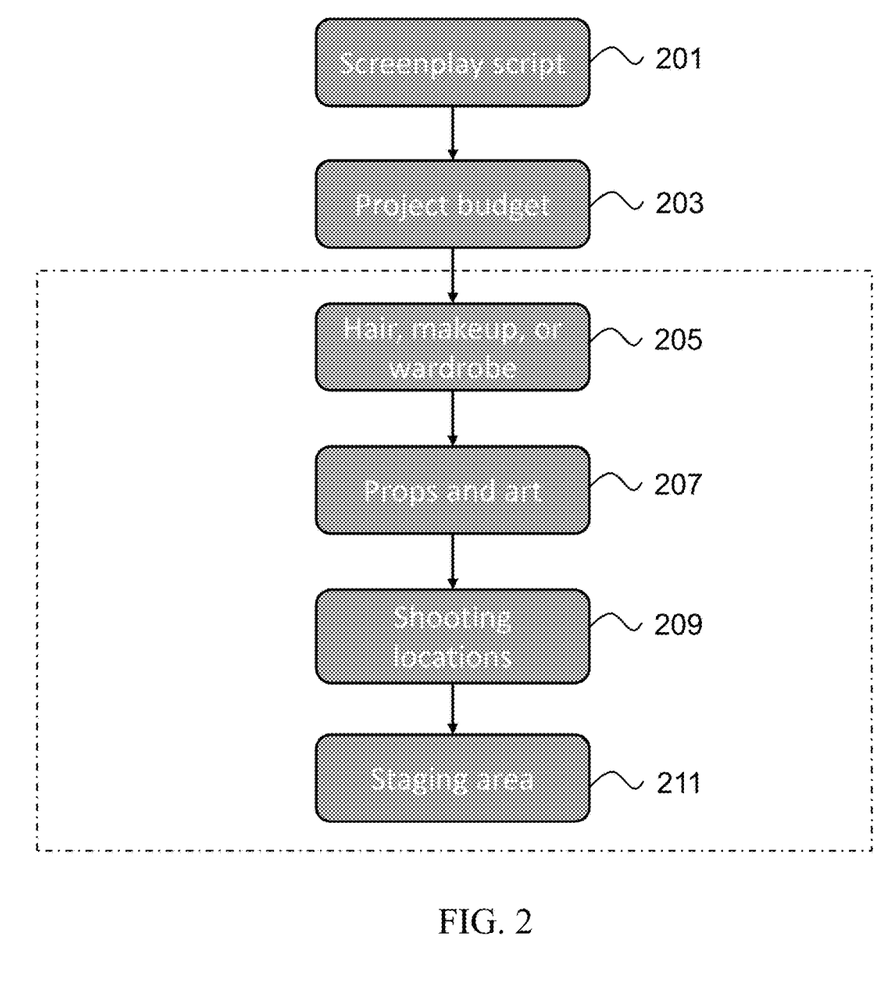
FIG. 2 is a flowchart representation of an example pre-production process.

FIG. 2 is a flowchart representation of an example pre-production process. The pre-production process typically starts with a screenplay script 201. The screenplay is one of the most important elements in the pre-production stage because it specifies where the scenes will take place, what actors are involved in each scene, and/or what elements (e.g., props, art, etc.) are needed for each scene. Storyboard is often added to the screenplay to illustrate details about each scene. The screenplay may further define what equipment is needed for each shot. The screenplay can often be written with constraints in mind so that a corresponding project budge 203 can then be developed. Once the screenplay script is completed, the scenes shooting can be scheduled accordingly, as there may be dependencies among different scenes. Additional planning is needed for each scene, such as planning hairdo, makeup, and/or wardrobe 205, planning props and art 207, examining shooting locations 209, and/or planning staging areas 211.

Currently, most of these steps in this pre-production process are completed manually. While some software programs have been developed to introduce a certain level of automation into the process, they only targeted one specific step of the pre-production process. Many software programs are incompatible with each other, which means a screenplay script generated by one software cannot be exported for use in another software, thereby hindering a complete automation of the preproduction process.

This patent document includes techniques and systems that can be implemented in various embodiments to provide a fully automated cloud-based platform to manage the pre-production process. In particular, the techniques disclosed herein can be used to implement a standardized data structure that describe all aspects of pre-production activities. The pre-production process is an iterative process rather than single go-through process (e.g., budgeting relies on casting and scene location selection, and at the same time budgeting constraints impact scene design in the screenplay writing). It takes many cycles to create the final production script that maximizes production efficiency and movie quality within the constraints such as budget and timeline. During any of those cycles, different modules or subsystems of preproduction need to collaborate with each other. A uniform data structure across different steps of the pre-production stage is an essential element for the automation of the entire iterative preproduction process. The techniques disclosed herein further include details of an integrated cloud-based platform that not only manages the entire pre-production process but also facilitate production shooting and post-production editing.

Uniform Data Structure

A traditional movie script is meant to be read by humans. While some of the existing software programs can generate and store relevant data internally based on the screenplay scripts, the data is not stored in a standardized format to allow other systems to access such information. Therefore, automation of the entire pre-production process is severely limited due to the lack of uniform data structure. For example, when a screenplay script is updated (e.g., a new scene is added) in one system, budgeting and other scene planning activities need to be updated automatically in other systems. Without a standardized data structure applicable across different systems, each change requires manual updates in subsequent steps. Sometimes the changes have to be performed in a recursive manner manually.

To address this problem, a strong constrained and verbose data markup language can be used to define a set of standardized data structure. The standardized data structure can be implemented as a part of a machine-readable script as described in (1) International Patent Application PCT/CN2019/090722, entitled "PRODUCTION-AS-A-SERVICE SYSTEMS FOR MAKING MOVIES, TV SHOWS AND MULTIMEDIA CONTENTS" and filed on Jun. 11, 2019, and (2) U.S. patent application Ser. No. 16/516,690 of the same title and content filed on Jul. 19, 2019, the contents of which are incorporated by reference as part of the disclosure of this document. Such data structure can include sections that are correlated and constrained by each other. If any update in one section occurs, system can automatically propagate the changes through the entire data entity.

Some example sections that can be included in a machine-readable script are provided below:

1. General Information (title, producer information, genre, basic story/plot, plan movie release date, initial budget, etc.);

2. Staff Information (contact info for all personnel);

3. Equipment Information (cameras, audio recorders, costumes, dollies, cranes, etc.);

4. Cast Information (actors/actresses and their roles constrained by budget);

5. Scenes and Shots (all scenes listed in playing order, all shots with corresponding budget constraints, cast and equipment);

6. Budget (initial budget limits and an accurate estimation based on details such as casting, scenes, equipment);

7. Scheduling (detailed scheduling based on scene sections and constrained by budgeting, cast info, staff availability);

8. Commercial section (a list of embedded audio and video commercials); and

9. Other Information (finance, payroll, insurance, catering, etc.)

Table 1 shows an example machine-readable script that includes several sections.

TABLE 1

An example machine-readable script

```
<?xml version="1.0" encoding="UTF-8"?>
<movie id=123456
 xmlns:xsi="http://www.w3.org/2001/XMLSchema-instance"
 xsi:noNamespaceSchemaLocation="mpaas_movie.xsd">
  <general_info>
    ...
  </general_info>
  <staff_info>
    ...
  </staff_info>
  <equipment_info>
    ...
  </equipment_info>
  <cast_info>
    ...
  </cast_info>
  <scenes>
    ...
  </scenes>
  <budget>
    ...
  </budget>
  <schedule>
    ...
  </schedule>
  <commericals>
    ...
  </commericals >
  <other_info>
    ...
  </other_info>
</movie>
```

In some embodiments, the system can automatically adjust parameters for different sections so that various constraints, such as time, budget, and/or staff availability, can be satisfied.

Figure 3:
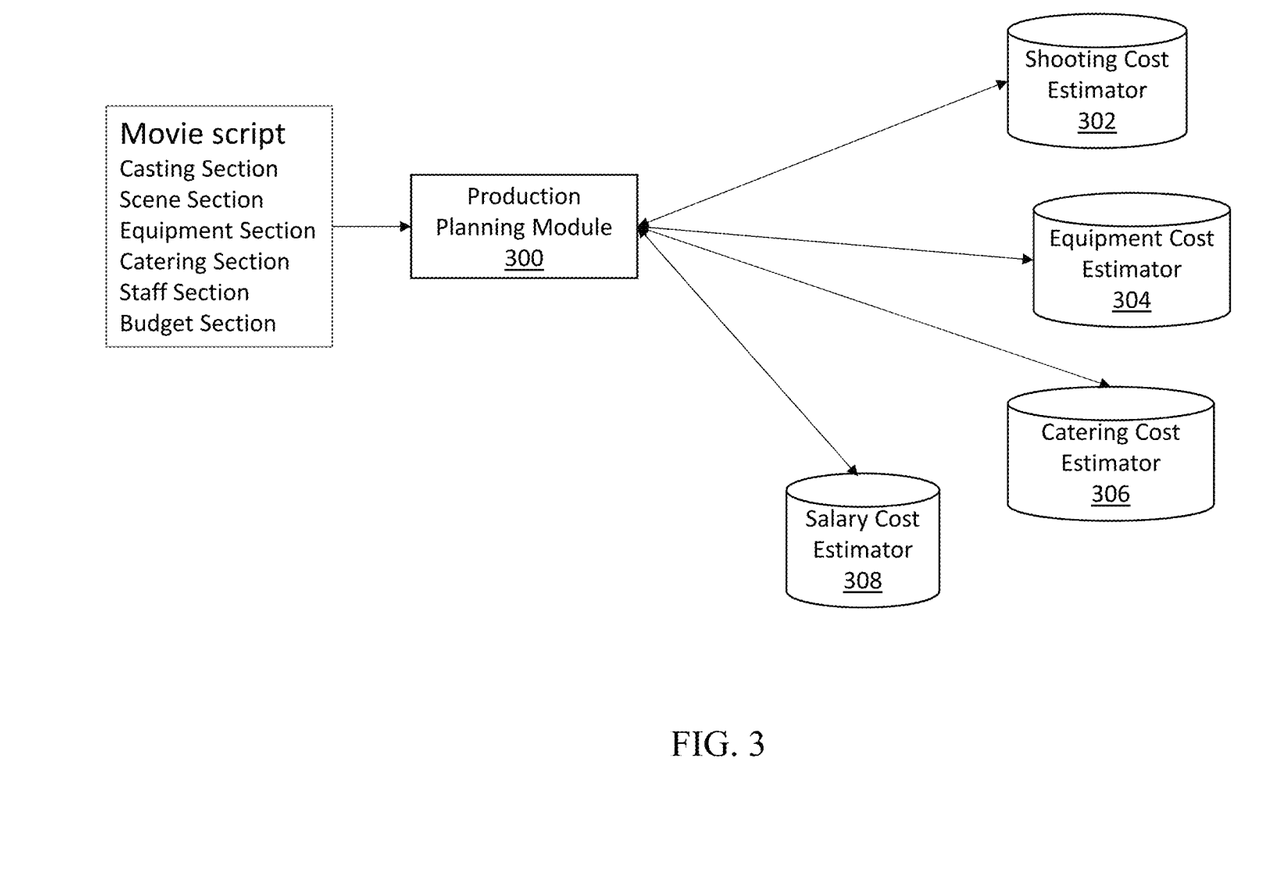
FIG. 3 illustrates an example architecture of a production planning module in accordance with the present technology.

FIG. 3 illustrates an example architecture of a production planning module for implementing the present technology. In this example, the production planning module 300 can include multiple subsystems to perform cost estimation for a production. For example, as shown in FIG. 3, the production planning module 300 includes a shooting cost estimator 302 that estimates the cost for shooting the movie and TV footage (including, for example, costs for the shooting locations, permits, transportation such as trucks or busses, electric and other costs for shooting), an equipment cost estimator 304 that estimates the costs for the production equipment (including, for example, cameras, camera tripods and dollies, lighting equipment, sound equipment, grip equipment, carts, rigging equipment and others), a catering cost estimator 306 for estimating catering services for food and beverages, and a salary cost estimator 308 for estimating costs of salaries for cast members, crew members (including the director) and contractors. Upon receiving the movie script, the planning module 300 can include software tools to analyze various sections and generate, using the corresponding estimator, estimated cost for each section (e.g., salary for cast, shooting cost, equipment, catering, etc.). The system in FIG. 3 can also be used to subsequently adjust parameters in the script to satisfy various constraints or changes in the production process. For example, one main constraint for the pre-production stage is that the sum of all estimated costs should not exceed the total budget allowed. Another constraint is that the arrangement of the shooting sequences, taking into account of availability of the scenes and cast, should not exceed the desired total production time.

The production planning module in FIG. 3 can be optimized based on an operation optimization approach. Below is an example illustrating how to maximize an objective within a number of constraints. In this example, the shooting equipment, human resources, and/or activities in the script can be represented as elements. Depending on the circumstances of production projects, some elements can be identified as optional while other elements are identified as mandatory. For example, an audio recording device can be marked as optional while a video recording device is mandatory. Furthermore, the number of video recording devices needed for a scene may vary across different scenes. Elements can be represented as vectors such as $$X = \begin{pmatrix} x_1 \\ x_2 \\ x_3 \end{pmatrix},$$

wherein $x_1$, $x_2$, $x_3$ is either 1 (indicating that the element is present) or 0 (indicating that the element is absent). For mandatory elements, the corresponding values must be 1. The values for optional elements can be either 0 or 1.

The production planning module 300 can adopt linear or non-linear solvers to solve the multi-factor optimization problem that involves various constraints. The following provides an example for using a linear solver. In implementations, non-linear solvers can be similarly applied.

In this example, the objective function for the optimization can be defined as:

$$F_{Objective} = F(A, B) \qquad \text{Eq. (1)}$$

Here, A represents time needed for each element and can be defined as $$A = \begin{pmatrix} a_1 \\ a_2 \\ a_3 \end{pmatrix}.$$

B represents cost required for each element and can be similarly defined as $$B = \begin{pmatrix} b_1 \\ b_2 \\ b_3 \end{pmatrix}.$$

In some embodiments, different weights can be allocated to time and cost. Coefficients can be used to further define the objective function as:

$$F_{Objective} = \overline{V_A} \cdot A + \overline{V_B} \cdot B + \overline{A} \cdot M_{AB} \cdot B \qquad \text{Eq. (2)}$$

Parameters $V_A$, $V_B$ can be predefined or adjustable coefficient vectors and $M_{AB}$ matrix is to represent the weights given to time and/or cost.

In some embodiments, to satisfy the two main constraints, the system needs to determine $$X = \begin{pmatrix} x_1 \\ x_2 \\ x_3 \end{pmatrix} \text{ and } Y = \begin{pmatrix} y_1 \\ y_2 \\ y_3 \end{pmatrix}$$

such that:

$$\overline{X} * A \leq \text{TotalAllowedTime}_A, \quad \text{Eq. (3)}$$

$$\overline{Y} * B \leq \text{TotalAllowedBudget}_B \quad \text{Eq. (4)}$$

Here, $$Y = \begin{pmatrix} y_1 \\ y_2 \\ y_3 \end{pmatrix}$$

is similarly defined as X to be a vector of values 0 or 1. The solver can determine X and Y that maximize $F_{Objective}$ while satisfying the constraint functions as shown in Eq. (3) and Eq. (4).

In some embodiments, additional constraints may be imposed. For example, the budget and time constraints described above can be represented as:

$$\Sigma_{STs}\Sigma_{CSLs}\Sigma_{SCs} \text{ Cost}_{ST,CSL,SC} \leq \text{MonetaryBudget}_{Production} \quad \text{Eq. (5)}$$

$$\Sigma_{STs}\text{Time}_{ST} \leq \text{TimeBudget}_{Production} \quad \text{Eq. (6)}$$

In the above equations, ST represents the shooting time for a single day, CLS represents a concurrent shooting location (e.g., a location is used for multiple shootings on the same day; there can be one or more concurrent shooting locations on a single day.), and SC represents a corresponding scene (e.g., there can be one or more scenes to be shot in serial order at same location). In addition, the working hours of the cast are limited by different local labor regulations. For example, for each person, the number of working hours on a shooting day needs to be within legal limits:

$$\text{Time}_{ST} = \Sigma_{CSLs,SCs}\text{Time}_{CSL,SC}^{Shooting} \leq \text{LegalHourLimit} \quad \text{Eq. (7)}$$

Furthermore, a person or a piece of equipment has geographical limitations—that is, each person or each piece of equipment can only be present at one location at a specification time of a day. Let Presence$_{EquipmentW,CSL-V}$ (0, 1) be equipment W at location V, the following constraint limits the piece of equipment at one location on a particular day:

$$\Sigma_{CSLs}\text{Presence}_{EquipmentW,CSL-V} \leq 1 \quad \text{Eq. (8)}$$

In some embodiments, the objective function can be defined by multiple factors such as:

$$F_{Objective} = F(f_{Casts}, f_{Scenes}, f_{Equipment}, \text{Others}) \quad \text{Eq. (9)}$$

That is, the objective function is positively correlated to cast quality, equipment quality, and aesthetic quality. Additional factors, such as the number of indoor or outdoor scenes, may also be defined as a part of the objection function (e.g., certain themes may prefer a larger number of outdoor scenes). The production planning module 300 then determines the presence (or absence) of the elements to obtain the maximum value for the objective function.

Figure 4:
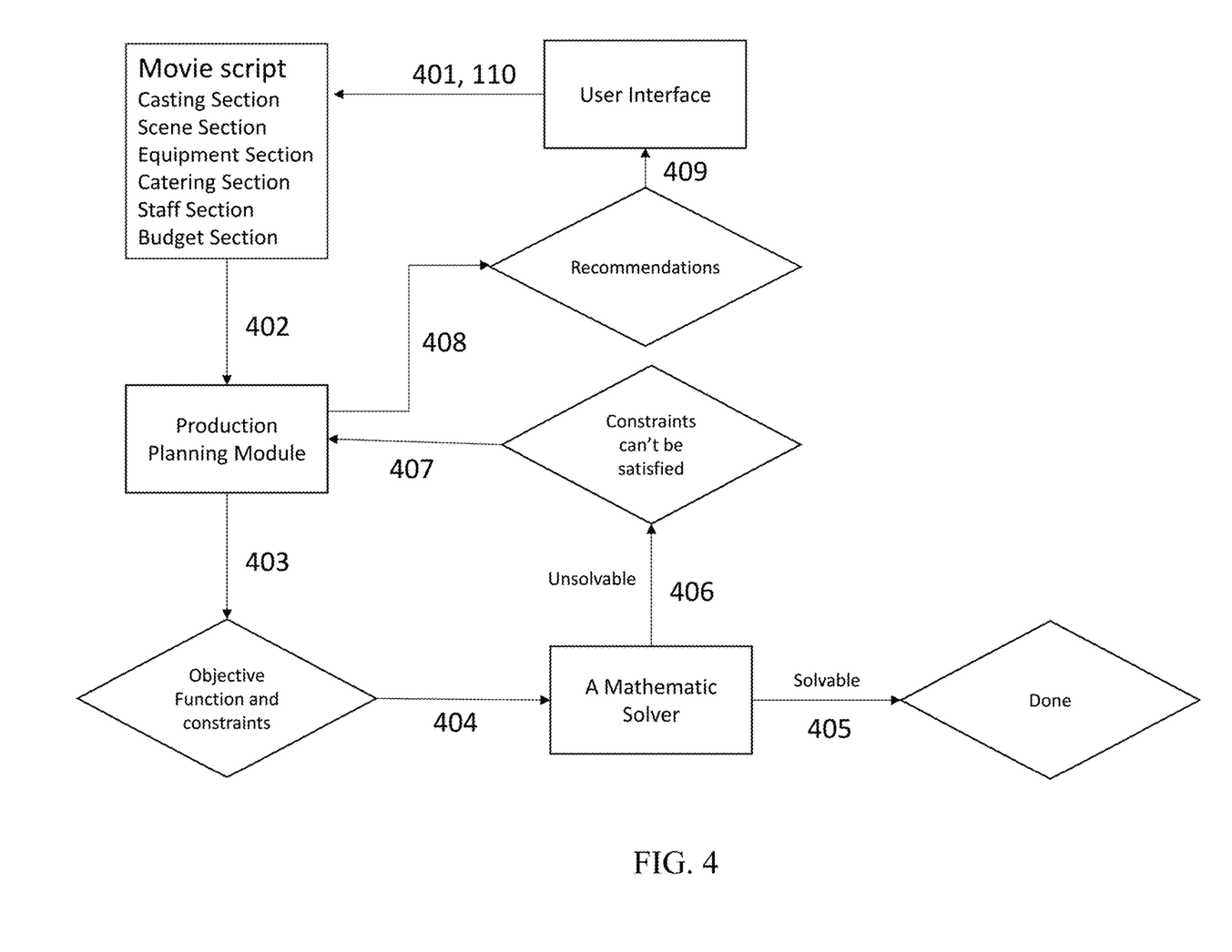
FIG. 4 illustrates an iterative process in which a production planning module adjusts production elements in accordance with the present technology.

FIG. 4 illustrates an iterative process in which a production planning module in FIG. 3 is operated to adjust production elements in accordance with the present technology. At Step 401, a user provides content (e.g., a storyline) that allows the system to generate a machine-readable movie script. At Step 402, the production planning module takes the script as an input and determines, at Step 403, the corresponding objective function and constraints. At Step 404, a mathematic solver (e.g., a linear or non-linear solver) is used to determine the values for the production elements so as to obtain a maximum value for the objective function. If the objective function is solvable, the solver completes its tasks at Step 405. However, as in Step 406, the system may not be able to generate a solution given the constraints (that is, the objective function is unsolvable). For example, many elements are identified as mandatory and the budget is simply too small to shoot the desired number of scenes. In those cases, the solver reports the determination to the production planning module at Step 407. At Step 408, the production planning module can generate recommendations or notifications to be presented to the user at Step 409 so that manual input can be provided to correct the error. In some embodiments, the recommendations can be a set of possible solutions if one or more mandatory elements are adjusted to be optional. At step 410, the user can manually adjust budget, timeline, or other production factors, given the recommendations or the notifications provided by the planning module. In some embodiments, the user can select one of the recommendations provided by the system. In some embodiments, the user can manually adjust some of the elements as desired. The planning module then repeats the whole process to attempt to obtain an optimal solution again.

Referring back to the example of a machine-readable script Table 1, in each section of the standardized data structure, additional tags can be defined to further describe details about the corresponding section. For example, a movie includes multiple scenes, each comprising multiple shots.

Figure 5:
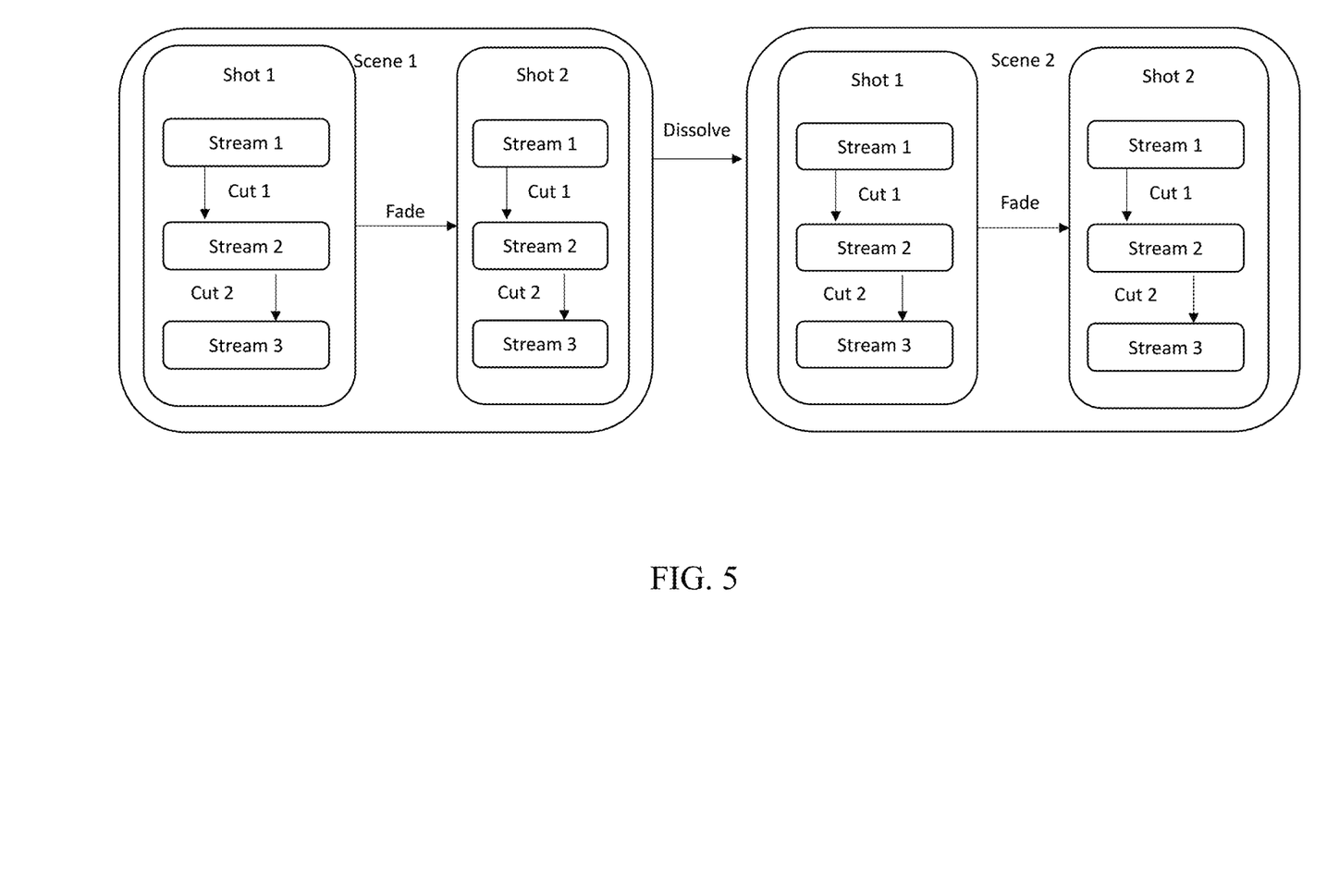
FIG. 5 illustrates an example structure of multiple scenes transitioning in a movie in accordance with the present technology.

FIG. 5 illustrates an example structure of multiple scenes transitioning in a movie in accordance with the present technology. As shown in FIG. 5, both Scene1 and Scene2 include multiple shots (e.g., Shot1 and Shot 2). Each shot is a continuous media recording that may include multiple media streams from different recording devices. Different streams may be edited (e.g., also referred to as "cut") to produce the cut. Between different scene, there is also a transition, such as the operation "dissolve" shown in FIG. 5.

This scene structure can be represented as a part of the standardized data structure in the machine-readable script. Elements such as indoor/outdoor, day/night, lines can all be represented by specific tags in the machine-readable script. Similarly, transition from one scene to another scene (dissolve, fading-in, fade-out, etc.) or from one shot to another shot can also be presented as tags. Table 2 shows an example representation of scenes in accordance with the present technology.

TABLE 2

Example machine-readable script for scenes

```
<scene id=10>
  <transition>fade in</transition>
  <movietime>00:30:25</movietime>
  <duration unit=minute>15</duration>
  <scene id=5>
  <location>
    <city>San Francisco</city>
    <latitude>120000</latitude>
    <longitude>120000</ longitude>
    <indoor_outdoor>outdoor</indoor_outdoor>
    <address>...</address>
  </location>
  <time>
    <shooting_date>04/05/2019</shooting_date>
    <day_night>day</day_night>
  </time>
  <staff>
    <director>John Doe</director>
    <photographers>
      ...
    </photographers>
    ...
  </staff>
  <casts>
    <actor>Forrest</actor>
    <actress>Jenny</actress>
    ...
  </casts>
  <commercials>
    <commercial id=1>
      <type>billboard</type>
      <shape>rectangle</shape>
      <pattern>black-white-grid</pattern>
    <commercial id=1>
      ...
  </commercials>
  <cameras>
    ...
  </cameras>
  <vehicles>
    ...
  </vehicles>
  <shot id=1>
    <camera id=1>
      <shot_type>close-up shot</shot_type>
      <direction>Forrest/right</direction>
      <angle>horizontal</angle>
    </camera>
    <camera id=2>
      <shot_type>close-up shot</shot_type>
      <direction>Jenny/left</direction>
      <angle>horizontal</angle>
    </camera>
    <camera id=3>
      <shot_type>media shot</shot_type>
      <direction>Forrest/Jenny/front</direction>
      <angle>horizontal</angle>
    </camera>
    <cut type='jump'>camera 3</cut>
    <action id=1 lapse=5s>Forrest and Jenny walking forward</action>
    <cut type='jump'>camera 2</cut>
    <line speaker='Forrest'>Which college are you going</line>
    <music>
      <id>12</id>
      <type>romantic</type>
      <action>play</action>
    </music>
    <cut type='match'>camera 3</cut>
    <action id=2>Jenny turned to Forrest</action>
    <line speaker='Jenny'>I am going to DC to protest</line>
    <action id=3 lapse=40s>Forrest and Jenny walk in silence</action>
    <cut type='jump'>camera 1</cut>
    <music>
      <action>stop</action>
    </music>
  </shot>
  ...
  <shot id=2>
```

TABLE 2-continued

Example machine-readable script for scenes

```
  </shot>
  ...
  <shot id=3>
  </shot>
  <transition>dissolve</transition>
</scene>
```

As shown in Table 2, transitions can be defined using a tag (e.g., transition). Additionally, the machine-readable script can define the corresponding editing operation for different streams. For example, "cut type" is defined for Camera2 and Camera3 as shown in Table 2. These tags can not only help scene planning in pre-production stage but also facilitate automated post-production editing. Music and other background sound can also be added to the machine-readable script for each scene to automate sound mixing for post media editing.

Furthermore, the structured computer readable script enables computer aided shooting in the production stage. For example, the machine-readable script can include the timestamp and duration of each shot, the location and angles for each camera, and/or shot types (e.g., long shot, close-up shot, full shot, medium shot, etc.). Each shot may also be associated with a storyboard that links to a cartoon file in a file directory. Shooting instructions based on the structured scene data can be transmitted to end-devices to automate scene shooting.

Movie embedded commercials can also be added to each scene. For example, as shown in Table 2, the machine-readable script can specify the commercial type as well as the shape and pattern of a placeholder (or marker) during shooting. In post-production editing stage, the specific product can be automatically added to the placeholder/marker in fully automated fashion as described in PCT/CN2019/099534, entitled "ADAPTIVE MARKETING IN CLOUD-BASED CONTENT PRODUCTION" and filed on Aug. 7, 2019, the content of which is incorporated by reference as part of the disclosure of this document.

It is noted that Table 2 is a simple example of a machine-readable script that includes some of the essential elements of a scene. More artistic and commercial functions can be added as new elements into the script for further processing by the production planning module shown in FIG. 3.

Integrated Cloud-Based System

The standardized data structure described above allows information included in the machine-readable script to be shared across different steps of the pre-production stage and various stages of the production process. As activities in the pre-production stage are often interrelated, iterative and recursive, any changes in the screenplay can result in changes in the scenes, which in turn impact equipment, cast, and budget. The standardized data structure allows changes to be propagated to different steps. Accordingly, an integrated pre-production system can be developed to handle all tasks in the pre-production stage. The integrated system can be a central system, or a distributed system, such as a cloud-based system, to integrate existing components used in the pre-production planning.

Figure 6:
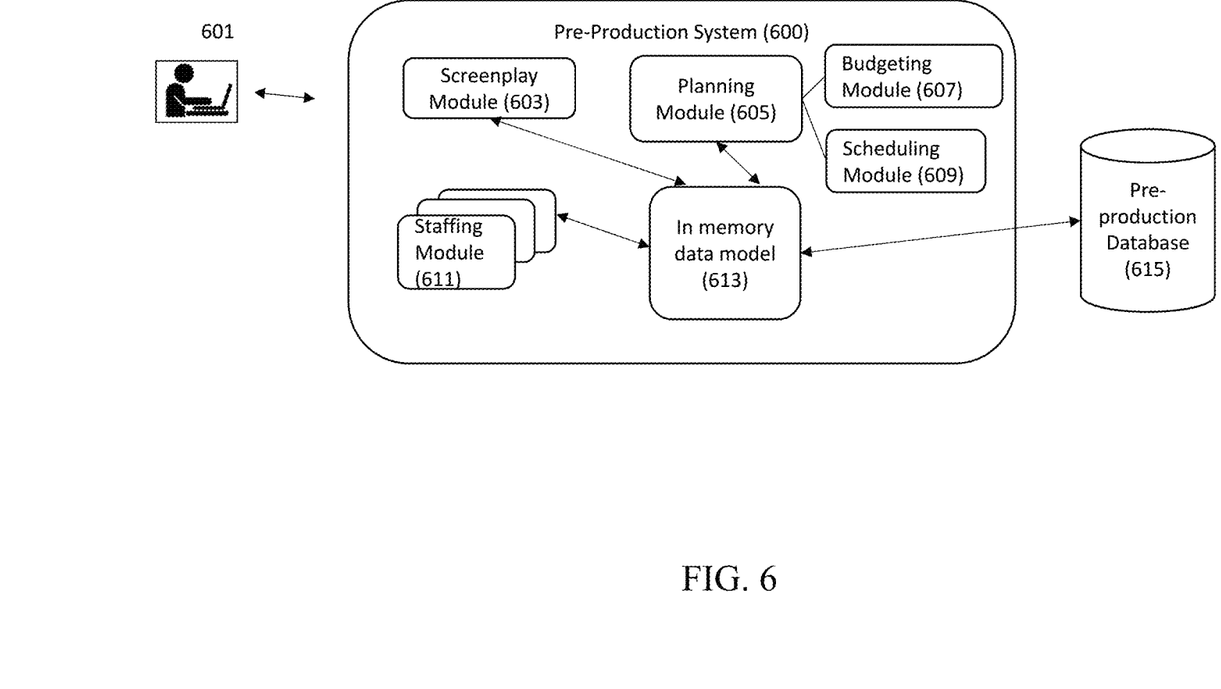
FIG. 6 illustrates an example architecture of a pre-production system in accordance with the present technology.

FIG. 6 illustrates an example architecture of a pre-production system for implementing the present technology. As shown in FIG. 6, the integrated pre-production system 600 takes an input in the form of a novel or a screenplay script.

The pre-production system 600 provides a user interface 601 to guide a director or a user through different steps of the pre-production process to plan the production. In some embodiments, the pre-production system 600 can include various modules, such as a screenplay module 603 to generate the machine-readable script, and a planning module 605 to optimize production elements so as to satisfy various constraints in the production process. The planning module 605 can communicate with a budgeting module 607 and a scheduling module 609 to obtain information regarding the estimated budget and/or estimated production timeline. In some embodiments, the pre-production system also includes a staffing module 611 that allows personnel to get specific data from the system according to their roles. Different roles may be given different access levels to change or modify the relevant information.

All pre-production elements are maintained a unified data entity 613 such as the machine-readable script as described above and can be stored in a database 615. In some embodiments, the integrated system 600 can be deployed as a cloud-based service, such as Movie Production As A Service (MPaaS). Any change in one production element can trigger the system to propagate the change through all other interdependent elements. As discussed above, the system can employ operation optimization algorithms to determine the best routes of actions to minimize of cost within the constraints of budget, time, staffing and other factors if any change is made.

Figure 7:
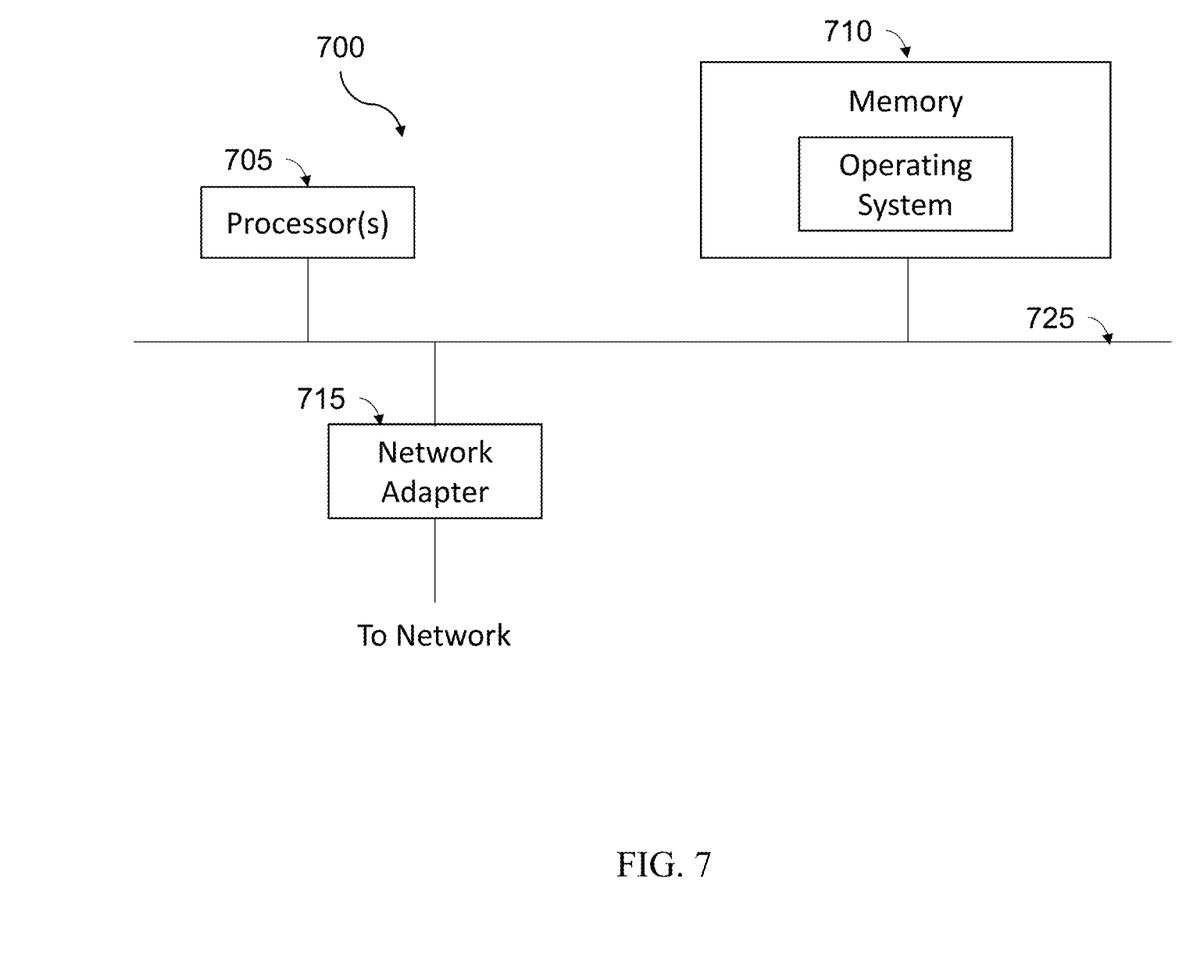
FIG. 7 a block diagram illustrating an example of the architecture for a computer system or other control device that can be utilized to implement various portions of the presently disclosed technology.

FIG. 7 is a block diagram illustrating an example of the architecture for a computer system or other control device 700 that can be utilized to implement various portions of the presently disclosed technology (e.g., the production planning module). The computer system 700 includes one or more processors 705 and memory 710 connected via an interconnect 725. The interconnect 725 may represent any one or more separate physical buses, point to point connections, or both, connected by appropriate bridges, adapters, or controllers. The interconnect 725, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 705 may include central processing units (CPUs) to control the overall operation of, for example, the host computer. In certain embodiments, the processor(s) 705 accomplish this by executing software or firmware stored in memory 710. The processor(s) 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 710 can be or include the main memory of the computer system. The memory 710 represents any suitable form of random access memory (RAM), read-only memory (ROM), flash memory, or the like, or a combination of such devices. In use, the memory 710 may contain, among other things, a set of machine instructions which, when executed by processor 705, causes the processor 705 to perform operations to implement embodiments of the presently disclosed technology.

Also connected to the processor(s) 705 through the interconnect 725 is a (optional) network adapter 715. The network adapter 715 provides the computer system 700 with the ability to communicate with remote devices, such as the storage clients, and/or other storage servers, and may be, for example, an Ethernet adapter or Fiber Channel adapter.

Figure 8:
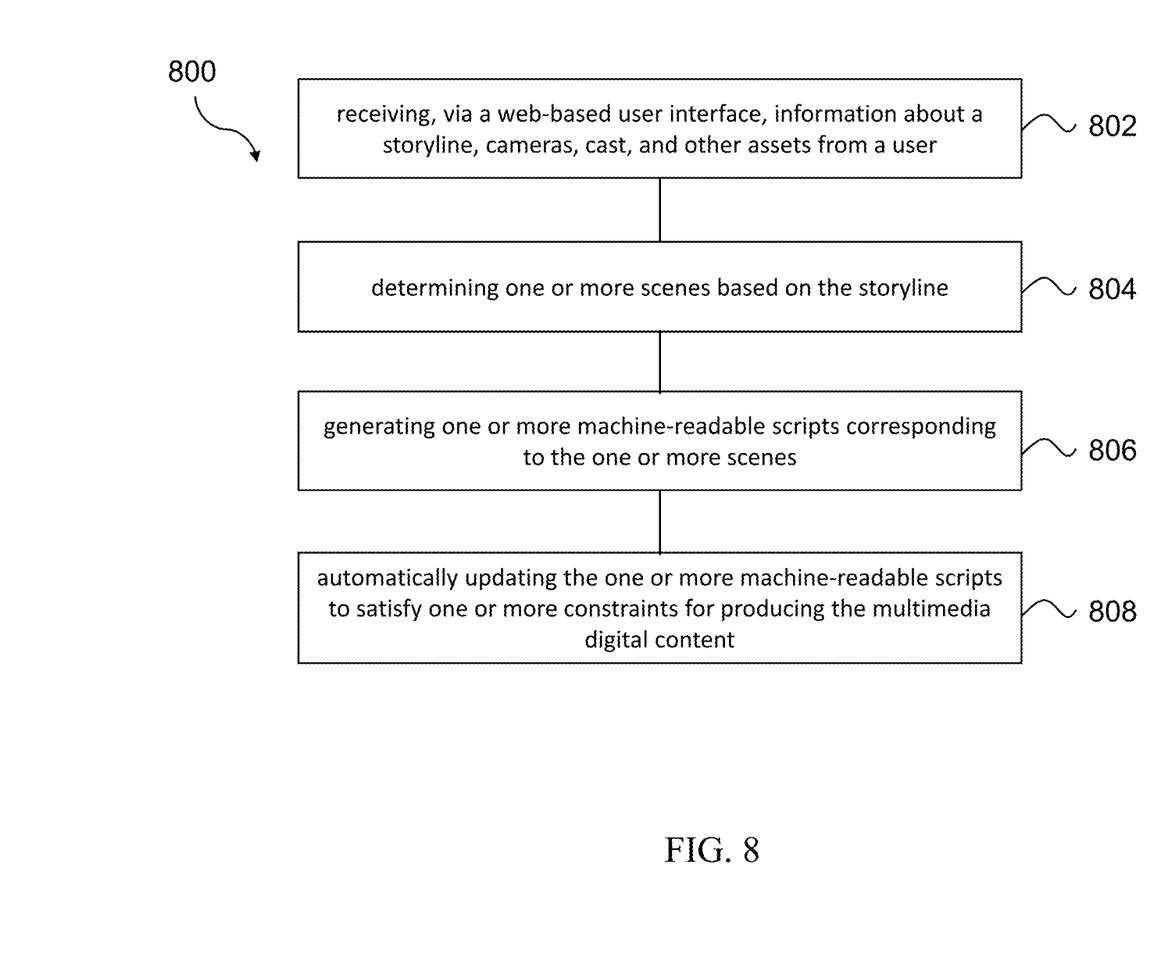
FIG. 8 is a flowchart representation of a method for producing a multimedia digital content including a movie in accordance with the present technology.

FIG. 8 is a flowchart representation of a method 800 for producing a multimedia digital content including a movie in accordance with the present technology. The method 800 includes, at operation 802, receiving, via a user interface, information about a storyline, cameras, cast, and other assets for the movie from a user. The method 800 includes, at operation 804, determining one or more scenes based on the storyline. The method 800 includes, at operation 806, generating one or more machine-readable scripts corresponding to the one or more scenes. The one or more machine-readable scripts include scheduling information, personnel information, or budget information for the movie. The method 800 also includes, at operation 808, automatically updating the one or more machine-readable scripts to satisfy one or more constraints for producing the multimedia digital content.

In some embodiments, updating the one or more machine-readable scripts comprises identifying elements in the one or more machine-readable scripts as optional or mandatory and adjusting, based on the one or more constraints, at least one of the optional elements as absent in the one or more machine-readable scripts. The elements can include one or more scenes, one or more cast members, or one or more equipment. In some embodiments, adjusting the at least one of the optional elements comprises solving an objective function based on a linear or non-linear solver. In some embodiments, the objective function is positively correlated to at least one of cast quality, equipment quality, or aesthetic quality. In some embodiments, the method includes providing, upon determining that at least one of the one or more constraints is not satisfied, a set of recommendations to the user via the user interface for adjusting the information. The method can further include iteratively updating the one or more machine-readable scripts based on the adjusted information.

It is thus evident that, with the assistance from the cloud-based movie production systems and techniques as disclosed herein, movies, TV shows or videos can be produced at a much lower cost and at a much higher speed. The repetitive and time-consuming planning can be replaced by automation and modifications specific to each storyline.

The above examples demonstrate that the techniques and systems disclosed in this patent document for production of movies, TV shows and other multimedia based on, for example, full automation of the pre-production planning, cloud computing and on-line accessing, can be used to enhance the existing productions by movie and TV production companies, to reduce labor and costs, to provide flexibility and features that are not available in various convention movie or TV production processes. In addition, the disclosed techniques and systems can be used to simplify the pre-production processes and thus enable amateur production of movies and videos. Instead of costing at least half million dollars for lowest cost movie production, movies can be made with a few thousand dollars (or even a few hundred dollars) using the disclosed techniques. The low cost can incentivize a large group of artists to produce intriguing content, which can potentially lead to a hundred-billion-dollar industry. The techniques and systems disclosed in this patent document can be implemented to allow movie production technologies to be better utilized by professional production companies and to also allow such technologies assessable to more users in the mass market.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, machine-readable script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A pre-production system for producing a multimedia digital content, comprising a processor configured to:
   determine one or more scenes based on a storyline for the multimedia digital content and information about cast and equipment for shooting the multimedia digital content;
   generate one or more machine-readable scripts corresponding to the one or more scenes, wherein the one or more machine-readable scripts include scheduling information for shooting the one or more scenes, personnel information regarding persons involved in shooting the one or more scenes, or budget information for budgeting costs for shooting the one or more scenes that is determined based on various information including the information about the cast and the equipment for shooting the multimedia digital content;
   automatically update the one or more machine-readable scripts to satisfy production constraints, wherein the production constraints include time, cost, equipment availability, or availability of human resources for cast members and staff members;
   provide, upon determining that at least one of the production constraints is not satisfied, a set of recommendations to a user to enable the user to select one of the set of recommendations adjusting the storyline or the information about the cast and the equipment; and iteratively update the one or more machine-readable scripts based on the selected one of the set of recommendations.

2. The system of claim 1, wherein the one or more machine-readable scripts are updated using a formulation that associates the production constraints to one another and to a desired production objective, wherein the production objective includes at least one of a quality of the cast, a quality of the equipment, or an aesthetic quality of the multimedia digital content.

3. The system of claim 1, wherein the processor is configured to update the one or more machine-readable scripts based on a linear or non-linear solver.

4. The system of claim 1, wherein the processor is configured to determine the production constraints based on the scheduling information, the personnel information, or the budget information.

5. The system of claim 1, wherein the processor is configured to model presence of an equipment for one or more concurrent shooting locations.

6. The system of claim 1, wherein the processor is configured to adapt a number of working hours of at least a member of the cast in the one or more machine-readable scripts.

7. The system of claim 1, wherein the processor is configured to update the one or more machine-readable scripts by converting a mandatory constraint of the production constraints to an optional constraint.

8. The system of claim 1, wherein the one or more machine-readable scripts comprise information that is applicable in a production stage or a post-production stage for producing the multimedia digital content.

9. The system of claim 1, wherein the pre-production system is deployed as a cloud-based service configured to enable production shooting and/or post-production editing.

10. A method for preparing a multimedia digital content production, comprising:
   providing a storyline for the multimedia digital content and information about cast and equipment for shooting the multimedia digital content, wherein the storyline corresponds to one or more scenes;
   obtaining one or more machine-readable scripts corresponding to the one or more scenes, wherein the one or more machine-readable scripts include scheduling information for shooting the one or more scenes, personnel information regarding persons involved in shooting the one or more scenes, or budget information for budgeting costs for shooting the one or more scenes that is determined based on various information including the information about the cast and the equipment for shooting the multimedia digital content, and wherein the one or more machine-readable scripts are updated to satisfy production constraints, wherein the production constraints include time, cost, equipment availability, or availability of human resources for cast members and staff members;
   receiving a set of recommendations for adjusting the storyline or the information about the cast and the equipment in response to at least one of the production constraints not being satisfied; and
   providing feedback to enable an iterative update of the one or more machine-readable scripts.

11. The method of claim 10, wherein the one or more machine-readable scripts are updated using a formulation that associates the production constraints to one another and to a production objective, wherein the production objective includes at least one of a quality of the cast, a quality of the equipment, or an aesthetic quality of the multimedia digital content.

12. The method of claim 10, wherein the one or more machine-readable scripts are updated by converting a mandatory constraint of the production constraints to an optional constraint.

13. The method of claim 10, wherein the one or more machine-readable scripts comprise information that is applicable in a production stage or a post-production stage for producing the multimedia digital content.

14. A non-transitory computer program product having code stored thereon, the code, when executed by a processor, causing the processor to implement a method that comprises:
   determining one or more scenes based on a storyline for a multimedia digital content and information about cast and capturing equipment for shooting the multimedia digital content;
   generating one or more machine-readable scripts corresponding to the one or more scenes, wherein the one or more machine-readable scripts include scheduling information for shooting the one or more scenes, personnel information regarding persons involved in shooting the one or more scenes, or budget information for budgeting costs for shooting the one or more scenes that is determined based on various information including the information about the cast and the equipment for shooting the multimedia digital content;
   automatically updating the one or more machine-readable scripts to satisfy production constraints based on a formulation that associates the production constraints to one another and to a production objective, wherein the production constraints include time, cost, equipment availability, or availability of human resources for cast members and staff members;
   provide, upon determining that at least one of the production constraints is not satisfied, a set of recommendations to a user to enable the user to select one of the set of recommendations adjusting the storyline or the information about the cast and the equipment; and
   iteratively update the one or more machine-readable scripts based on the selected one of the set of recommendations.

15. The non-transitory computer program product of claim 14, wherein the production objective includes at least one of a quality of the cast, a quality of the equipment, or an aesthetic quality of the multimedia digital content.

16. The non-transitory computer program product of claim 14, wherein the method comprises:
   updating the one or more machine-readable scripts based on a linear or non-linear solver as part of the formulation.

17. The non-transitory computer program product of claim 14, wherein the production constraints are determined based on the scheduling information, the personnel information, or the budget information.

18. The non-transitory computer program product of claim 14, wherein the method comprises:
   modeling a presence of an equipment for one or more concurrent shooting locations.

19. The non-transitory computer program product of claim 14, wherein the method comprises:
   adapting a number of working hours of at least a member of the cast in the one or more machine-readable scripts.

20. The non-transitory computer program product of claim 14, wherein the one or more machine-readable scripts are updated by converting a mandatory constraint of the production constraints to an optional constraint.

* * * * *